United States Patent [19]

Robinson

[11] 4,082,696

[45] Apr. 4, 1978

[54] METHOD OF CATALYST MANUFACTURE

[75] Inventor: Delmar W. Robinson, Arlington Heights, Ill.

[73] Assignee: UOP Inc., Des Plaines, Ill.

[21] Appl. No.: 725,801

[22] Filed: Sep. 23, 1976

Related U.S. Application Data

[63] Continuation-in-part of Ser. No. 603,838, Aug. 11, 1975, abandoned.

[51] Int. Cl.$^2$ .................... B01J 21/04; B01J 23/42; B01J 23/74
[52] U.S. Cl. ...................... 252/466 B; 252/472; 208/138
[58] Field of Search ............ 252/466 B, 466 PT, 448, 252/472; 208/138

[56] References Cited

U.S. PATENT DOCUMENTS 3,986,984   10/1976   Michalko ................ 252/466 PT

*Primary Examiner*—W. J. Shine
*Attorney, Agent, or Firm*—James R. Hoatson, Jr.; Robert W. Welch; William H. Page, II

[57] ABSTRACT

A method of catalyst manufacture. A calcined tin-containing refractory inorganic oxide support or carrier material is impregnated with an acidic solution of a precursor compound of a platinum group metal and a precursor compound of an iron group metal. The impregnated carrier material is dried over an extended period to reduce the volatile content thereof to less than about 15 wt. % prior to high temperature calcination. Drying the impregnated carrier material in accordance with the present invention provides a catalyst substantially improved in activity stability.

6 Claims, No Drawings

METHOD OF CATALYST MANUFACTURE

CROSS-REFERENCE TO RELATED APPLICATIONS

This application is a continuation-in-part of a copending application Ser. No. 603,838 filed Aug. 11, 1975, now abandoned.

This invention relates to the manufacture of a catalytic composite particularly suitable for use as a multifunctional catalyst. More specifically, the present invention relates to the manufacture of a catalytic composite of a platinum group metal component and an iron group metal component impregnated on a tin-containing refractory inorganic oxide, said composite having exceptional activity stability with respect to those hydrocarbon conversion processes comprising two or more hydrocarbon conversion reactions occurring simultaneously or substantially simultaneously, said reactions including cracking, hydrocracking, cyclization, dehydrocyclization, hydrogenation, dehydrogenation, isomerization, alkylation, and the like.

The reforming of a gasoline boiling range hydrocarbon feed stock is a classic example of a hydrocarbon conversion process comprising several simultaneously occurring hydrocarbon conversion reactions. The reforming process is a catalytic process designed to promote a number of octane-improving hydrocarbon conversion reactions affecting paraffins and naphthenes — the feed stock components which offer the greatest potential for octane-improvement. The process is thus designed to promote the isomerization, dehydrogenation, hydrocracking, and especially the dehydrocyclization of paraffins. With respect to naphthenes, the principal octane-improving reaction involves dehydrogenation and ring isomerization to yield aromatics of improved octane value.

A catalytic composite comprising a platinum group metal component and an iron group metal component impregnated on a tin-containing refractory inorganic oxide support or carrier material has been found to effect a substantial improvement with respect to the activity, selectivity, and/or stability when employed in those hydrocarbon conversion processes which typically require a multifunctional catalyst. In particular, it has been determined that a catalytic composite comprising a platinum component and a cobalt component impregnated on a tin-containing alumina support or carrier material can be utilized to effect a substantial improvement with respect to the reforming of a gasoline boiling range hydrocarbon feed stock. The principal advantage associated with the use of the described catalytic composite is its ability to function effectively in a high severity reforming operation, for example, in a lowpressure reforming operation, which is more conducive to the dehydrogenation of naphthenes and paraffins — the principal octane-improving reaction.

It is generally recognized that catalysis involves a mechanism particularly noted for its unpredictability. Minor variations in a method of manufacture often result in an unexpected improvement in the catalyst product. The improvement may result from an undetermined and minor alteration of the physical character and/or composition of the catalyst product to yield a novel composition difficult of definition and apparent only as a result of substantially improved, selectively and/or stability realized with respect to one or more hydrocarbon conversion reactions. For example, it has been discovered that the aforementioned catalyst, modified in the course of its manufacture by drying the impregnated carrier material at a controlled rate over an extended period to reduce the volatile content thereof to less than about 15 wt. % prior to high temperature calcination, exhibits a substantial and unexpected improvement, particularly with respect to activity stability under high severity reforming conditions.

It is therefore an object of this invention to present a novel method of catalyst manufacture. It is a more specific object to present a novel method of manufacturing a catalytic composite of a platinum group metal component and an iron group metal component impregnated on a tin-containing refractory inorganic oxide carrier material to produce an improved multifunctional hydrocarbon conversion catalyst.

In one of its broad aspects, the present invention embodies a method of catalyst manufacture which comprises preparing a calcined tin-containing refractory inorganic oxide carrier material; impregnating said carrier material with an acidic solution with a precursor compound of a platinum group metal and a precursor compound of an iron group metal; maintaining the impregnated carrier material in an agitated state at a temperature up to about 195° C. over an extended period, and drying said carrier material to a volatile content of less than about 15 wt. % as determined by weight loss on ignition at 900° C., said extended period being equivalent to at least about 0.5 hours per 100 pounds of impregnated carrier material on a volatile-free basis, and not less than about 2 hours; heating the dried impregnated carrier material in an oxidizing atmosphere at a temperature of from about 450° to about 675° C., and thereafter in a reducing atmosphere at a temperature of from about 300° C. to about 675° C.

Other objects and embodiments of this invention will become apparent in the following detailed specification.

The calcined tin-containing refractory inorganic oxide utilized as a support or carrier material pursuant to the method of this invention may be prepared in any conventional or otherwise convenient manner. The tin component is advantageously incorporated in the refractory inorganic oxide by the device of solubilizing a tin compound in a sol precursor of a desired refractory inorganic oxide carrier material. The sols herein contemplated are such as are prepared by the hydrolysis of an acid salt of an appropriate metal in aqueous solution followed by a reduction in the acid anion concentration whereby olation occurs and inorganic polymers of colloidal dimension are formed dispersed and suspended in the remaining liquid. For example, the refractory inorganic oxides typically employed as carrier materials include alumina, silica, zirconia, titania, chromia, and the like, and an acid salt of an appropriate metal would therefore be such as the chlorides, sulfates, nitrates, acetates, etc., of aluminum, silicon, zirconium, titanium, chromium, and the like. More specifically, alumina is a preferred carrier material and suitable precursors thereof could be such as are prepared by the hydrolysis of aluminum chloride, aluminum sulfate, aluminum nitrate, aluminum acetate, etc., in aqueous solution, and treating the solution at conditions to reduce the acid anion concentration thereof, e.g., the chloride anion concentration.

Reduction of said acid anion concentration may be accomplished in any conventional or otherwise convenient manner. For example, an aqueous aluminum chloride solution can be subjected to hydrolysis utilizing an electrolytic cell with a porous partition between the anode and cathode whereby an acid anion deficiency is created in the cathode compartment with the formation of the desired sol. In some cases, as with an aqueous aluminum acetate solution, where the acid anion is sufficiently volatile, the desired reduction in anion concentration can be effected simply by heating. A particularly suitable method of preparing the sol precursor of the preferred alumina carrier material involves the use of aluminum metal as a neutralizing agent in conjunction with, for example, an aqueous aluminum chloride solution. In this instance, the salt of neutralization is itself a hydrolyzable aluminum salt subject to ultimate sol formation. One convenient and preferred method, particularly suitable for the preparation of an alumina sol, comprises digesting aluminum pellets or slugs in aqueous hydrochloric acid, and reducing the chloride anion concentration of the resulting aluminum chloride solution through the use of an excess of the aluminum reactant as a neutralizing agent. The described sols are suitably prepared to contain less than about 15 wt. % aluminum, preferably from about 12 to about 14 wt. %, with an aluminum/chloride atom ratio of from about 1:1 to about 2:1. Generally, such sols will contain from about 8 to about 12 wt. % chloride.

As heretofore stated, the tin component is advantageously incorporated in the refractory inorganic oxide by the device of solubilizing a tin compound in the sol precursor of the desired refractory inorganic oxide carrier material. Thus, regardless of the method of sol preparation, a tin compound is solubilized therein prior to gelation. Suitable tin compounds include stannous chloride, stannous bromide, stannous fluoride, stannic chloride, stannic fluoride, stannic iodide, stannic sulfate, stannic chloride trihydrate, stannic chloride tetrahydrate, stannic chloride pentahydrate, stannic chloride diamine, stannic chromate, stannic tartrate, and the like. In some cases, as in the case of stannous chloride, it is desirable to add the tin compound to the sol in solution with a halogen acid to obviate hydrolysis and premature precipitation of the tin component resulting in a non-uniform dispersion thereof in the refractory inorganic oxide.

Gelation of the sol, containing the tin component dispersed therein, can be effected in any conventional or otherwise convenient manner. Preferably, gelation is effected under conditions to yield a carrier material having a surface area of from about 25 to about 500 square meters per gram. The better results are realized when the refractory inorganic oxide is alumina, with gamma-, theta-, and eta-alumina giving the best results. The carrier material preferably has an average bulk density of from about 0.30 to about 0.70 grams per cubic centimeter, an average pore diameter of from about 20 to about 300 Angstroms, an average pore volume of from about 0.10 to about 1.0 cubic centimeters per gram, and a surface area of from about 100 to about 500 square meters per gram. In general, the best results have been obtained with a spherical carrier material about one-sixteenth inch in diameter and comprising gamma-alumina, and having an average bulk density of about 0.6 grams per cubic centimeter, a pore volume of about 0.5 cubic centimeters per gram, and a surface area of about 200 square meters per gram.

A preferred method for effecting gelation which affords a convenient means of developing the desired physical characteristics of the carrier material relates to the well-known oil-drop method substantially as described by J. Hoekstra in U.S. Pat. No. 2,620,314. Accordingly, the tin-containing sol is admixed with a gelling agent at below gelation temperature, and the resulting mixture is dispersed as droplets in a hot oil bath whereby gelation occurs with the formation of firm spherical gel particles. The spherical gel particles are thereafter subjected to one or more aging treatments whereby desirable physical characteristics are imparted thereto. The gelling agent in suitably a weakly basic material substantially stable at normal temperatures but hydrolyzable to ammonia with increasing temperature. Hexamethylenetetramine is described as a most suitable gelling agent. Thus, the sol-hexamethylenetetramine mixture is dispersed as droplets, while still below gelation temperature, into the oil suspending medium which is maintained at an elevated temperature effecting hydrolysis of the hexamethylenetetramine and gelation of the tin-containing sol into firm spherical gel particles. The hexamethylenetetramine is suitably utilized in an amount to effect substantially complete neutralization of the acid anion, e.g., chloride anion, content of the sol. Only a fraction of a hexamethylenetetramine is hydrolyzed or decomposed in the relatively short period during which initial gelation occurs. During the subsequent aging process, the hexamethylenetetramine retained in the spheres continues to hydrolyze to ammonia, carbon dioxide and amines, effecting further polymerization whereby the pore characteristics of the carrier material are established. Generally, the gel particles are aged in the oil bath for a period of from about 10 to about 24 hours at a temperature of from about 50° to about 105° C., and thereafter washed, dried and calcined.

As previously stated, the foregoing method affords a convenient means of developing desired physical characteristics in the carrier material. The method includes a number of process variables which affect the spherical gel product. Generally, the metals/acid anion ratio of the sol will influence the average bulk density of the gel product and, correspondingly the pore diameter and pore volume characteristics attendant therewith — lower ratios tending toward higher average bulk densities. Other process variables affecting physical properties including the time, temperature and pH at which the gel particles are aged. Usually, temperatures in the lower range and shorter aging periods tend toward higher average bulk densities. Surface area is normally a function of calcination temperature, a temperature of from about 425° to about 815° C. being suitably employed.

In keeping with the method of this invention, the tin-containing refractory inorganic oxide is impregnated with an acidic solution of a precursor compound of a platinum group metal and a precursor compound of an iron group metal. The catalytic composite of this invention will thus comprise a metal of the platinum sub-group of Group VIII of the Periodic Table, that is, platinum, palladium, rhodium, ruthenium, osmium and/or iridium, with platinum being a preferred component. The catalytic composite will also further comprise cobalt, or other of the iron subgroup metals of Group VIII, that is, iron or nickel. The tin-containing refractory inorganic oxide carrier material is suitably impregnated utilizing impregnating techniques known to the art. For example, the carrier material is suspended, soaked, dipped, or otherwise immersed in an acidic solution of a soluble precursor compound of a platinum group metal such as platinum chloride, chloroplatinic acid, ammonium chloroplatinate, dinitrodiaminoplatinum, palladium chloride, chloropalladic acid, rhodium chloride, rhodium nitrate, rhodium sulfate, rhodium sulfite, ruthenium chloride, osmium chloride, iridium chloride, iridium sulfate, and the like. The platinum group metal component and the iron group metal component can be impregnated on the support or carrier material from a common impregnating solution, or from separating impregnating solutions in any sequence. Suitable precursor compounds of the iron group metals include cobaltous chloride, cobaltous nitrate, cobaltous sulfate, nickel chloride, nickel nitrate, nickel sulfate, ferrous chloride, ferric chloride, etc., as well as the various hydrated forms thereof. Nitric acid, hydrochloric acid, or other halogen acid, is advantageously added to the impregnating solution to effect an optimum dispersion of the catalytically active platinum group metallic component over the available surface area of the tin-containing refractory inorganic oxide support or carrier material, and also to promote the acidic function of the catalytic composite with respect to certain hydrocarbon conversion reactions. In a preferred impregnating technique, a volume of tin-containing refractory inorganic oxide particles is immersed in a substantially equal volume of impregnating solution, in a steam-jacketed rotary dryer and tumbled therein for a brief period at about room temperature. Steam is thereafter applied to the dryer jacket to expedite evaporation of the impregnating solution in contact with the tumbling particles, and drying of the impregnated carrier material in accordance with the method of this invention. A relatively slow-drying of the impregnated carrier material under agitated conditions, such as is afforded by a rotary steam evaporator, is highly conducive to a uniform dispersion of the iron group metal component on the carrier surface.

The improvement, particularly with respect to the activity stability of the catalyst product, derived from the practice of this invention is considered to be the result of novel drying procedures whereby the impregnated carrier material is dried to a volatile content of less than about 15 wt. % prior to high temperature calcination. The drying process is effected over a relatively lengthy period equivalent to at least about 0.5 hour per 100 pounds of catalyst on a non-volatile basis, and over a period of at least about 2 hours. Further, the drying process is effected at a temperature up to about 195° C., a temperature in the range of from about 90° to about 150° C. being most suitable. While it is not intended to limit the present invention to any particular theory, it is believed that the novel drying procedure herein practiced promotes the distribution and dispersion, especially of the iron group metal component, on the carrier surface in a manner superior to what would otherwise be the case. It is further contemplated that the improved distribution and dispersion permits a more extensive reduction of the iron group metal component upon subsequent treatment at the reducing conditions hereinafter described. This is evidenced by the even and uniform color throughout each of the finished catalyst particles. In a preferred embodiment, the impregnated carrier material is dried at a temperature of from about 90° to about 150° C. and the volatile content thereof reduced to less than about 15 wt. % over an extended period equivalent to from about 0.5 to about 1.25 hours per 100 pounds of impregnated carrier material on a volatile-free basis, and in excess of about 2 hours.

Following the drying process, the impregnated carrier material is subjected to a high temperature calcination in accordance with prior art practice. Thus, the impregnated carrier material is heated in an oxidizing atmosphere, such as air, at a temperature to convert substantially all of the metallic components thereof to the oxide form, the temperature employed generally ranging from about 195° up to about 675° C. The calcining treatment is generally effected over a period of from about 2 to about 6 hours or more, and typically in stages, first at a temperature of from about 195° to about 450° C. over a 1 to 3 hour period, and then at a temperature of from about 450° to about 675° C. over a period of from about 2 to about 4 hours.

Prior to use, the calcined composite is subjected to a substantially water-free reduction step designed to insure optimum uniformity and dispersion of the catalytic components on the carrier surface. As heretofore mentioned, the drying procedure utilized herein appears to permit a more extensive reduction, particularly of the iron group metal component. In any case, substantially pure and dry hydrogen (e.g. less than 20 vol. ppm $H_2O$) is preferably employed as the reducing agent. This reduction treatment may be performed in situ as a part of the start-up sequence in a hydrocarbon conversion process if precautions are taken to predry the plant to a substantially water-free state and the hydrogen employed is substantially free of water. The reducing process is suitably accomplished at a temperature of from about 300° to about 675° C. over a period of from about 0.5 to about 10 hours.

The reduced catalytic composite is, in some cases, advantageously subjected to a sulfiding treatment prior to use in a given hydrocarbon conversion process, for example, to inhibit certain undesirable side reactions. The sulfiding treatment is typically designed to incorporate from about 0.02 to about 0.50 wt. % sulfur in the catalytic composite on an elemental basis. Preferably, the sulfiding treatment is in the presence of hydrogen, with hydrogen sulfide, lower molecular weight mercaptans, organic sulfides, and the like, being utilized as sulfiding agents with or without a hydrocarbon diluent. For example, it is common practice to utilize a mixture of hydrogen and hydrogen sulfide having about 10 moles of hydrogen per mole of hydrogen sulfide, and maintaining the mixture in contact with the catalytic composite at a temperature ranging from room temperature up to about 600° C. or more. It is generally good practice to perform the sulfiding step under substantially water-free conditions.

The catalytic composite of this invention preferably comprises from about 0.01 to about 5.0 wt. % tin in from about a 0.1:1 to about a 3:1 atom ratio with the platinum group metal content thereof, although larger quantities up to about 30 wt. % may be employed. With regard to the iron group metal content, which is preferably cobalt, the catalytic composite preferably comprises from about 0.5 to about 5.0 wt. % thereof calculated on an elemental basis.

The reforming of gasoline feed stocks in contact with the catalytic composite of this invention is suitably effected at a pressure of from about 50 to about 1000 psig and at a temperature of from about 425° to about 595° C. The catalyst of this invention permits a stable operation to be carried out in a preferred pressure range of from about 50 to about 500 psig. Similarly, the temperature required is generally lower than required for a similar reforming operation utilizing prior art reforming catalysts. Preferably, the temperature employed is in the range of from about 475° to about 575° C. Although the catalyst composition of this invention is most suitable for reforming, it may be used to promote other hydrocarbon conversion reactions including dehydrogenation, isomerization, destructive hydrogenation or hydrocracking, and oxidation to produce first, second and third stage oxidation products. Reaction conditions employed in the various hydrocarbon conversion reactions are those heretofore practiced in the art. For example, alkylaromatic isomerization reaction conditions include a temperature of from about 0° to about 535° C., a pressure of from about atmospheric to about 1500 psig, a hydrogen to hydrocarbon mole ratio of from about 0.5:1 to about 20:1 and a LHSV of from about 0.5 to about 20. Likewise, typical hydrocracking reaction conditions include a pressure of from about 500 to about 3000 psig, a temperature of from about 198° to about 500° C., a LHSV of from about 0.1 to about 10, and a hydrogen circulation rate of from about 1000 to about 10,000 SCF/BBL (standard cubic feet per barrel of charge).

The following examples are presented in illustration of the method of this invention and are not intended as an undue limitation on the generally broad scope of the invention as set out in the appended claims.

EXAMPLE I

In the preparation of a tin-containing alumina carrier material, an amount of stannic chloride, calculated to provide a catalytic composite containing about 0.2 wt. % tin, was dissolved in an aluminum hydroxychloride sol containing about 12 wt. % aluminum in a 1.1:1 ratio with the chloride anion content thereof. The mixture, with sufficient hexamethylenetetramine added thereto to effect about 200% neutralization of said chloride anion, was dispersed as droplets in a hot (95° C.) oil bath with the formation of spheroidal particles. The particles were allowed to age for about 20 hours in the hot oil bath, and then in an aqueous ammoniacal solution for about 6 hours. The aged particles were water-washed, dried and calcined in air at 370° to 510° C. for 1 hour and then at 620° C. for 1.5 hours. The calcined tin-containing alumina spheres had an average bulk density of about 0.57 grams per cubic centimeter. The tin-containing alumina, prepared by the described prior art method, is substantially as employed in the subsequent comparative examples.

EXAMPLE II

Tin-containing alumina spheres, substantially as prepared in Example I, were impregnated with a platinum component and a cobalt component. Thus, about 1950 pounds of the tin-containing alumina spheres were immersed in a substantially equal volume of an impregnating solution consisting of 99.06 troy ounces of platinum as chloroplatinic acid, 80.4 pounds of cobalt dichloride hexahydrate, 152 pounds of 32% hydrochloric acid, and 366 gallons of water. The spheres were tumbled in the solution in a rotary steam evaporator at about room temperature for 30 minutes, after which steam was applied to the evaporator jacket. The solution was evaporated over a period of about 18 hours under the influence of a flow of hot (95° C.) dry air and until the spheres showed a weight loss on ignition at 900° C. of 18.8%. The final product, calcined as hereinafter described, contained 0.325 wt. % platinum, 1.0 wt. % cobalt, and 0.2 wt. % tin. The catalyst in this example is hereinafter referred to as Catalyst "A".

EXAMPLE III

In this example, representing a preferred embodiment of this invention, tin-containing alumina spheres substantially as prepared in example I, were impregnated with a platinum component and a cobalt component substantially as described in Example II, except that in this case the impregnating solution was evaporated to dryness in contact with the tumbling spheres over a period of about 21 hours and under the influence of a flow of hot (95° C.) dry air thereby reducing the volatile content of the impregnated spheres to about 12.6 wt. % upon ignition at 900° C. The dried spheres, calcined as hereinafter described, contained 0.325 wt. % platinum, 1.0 wt. % cobalt and 0.2 wt. % tin. The catalyst of this example is hereinafter referred to as Catalyst "B".

The dried catalytic composites were in each case calcined in air for about 100 minutes at 195° C. and then for about 180 minutes at 565° C. during which time the chloride level was adjusted to about 1 wt. % by the addition of 0.9 molar HCl to the calciner. Thereafter, the catalytic composites were heated to 565° C. over an 8 hour period in a flow of dry hydrogen and maintained at said temperature for an additional hour. The hydrogen pressure was established at 25 psig and passed over the catalyst at a gaseous hourly space velocity of 280–300.

The catalysts thus prepared were evaluated in a reforming plant comprising a reactor, a high pressure-low temperature hydrogen separator and a debutanizer column. In the reforming operation, a hydrocarbon feed stock and a hydrogen-rich recycle stream were commingled and preheated to a temperature required to achieve and maintain a target octane number of 102 F-1 clear with respect to the $C_5+$ reformate product. The hydrocarbon feed stock was a gasoline fraction boiling in the 81°–191° C. range, said feed stock being characterized by an API at 60° F. of 59.7 and an F-1 clear octane rating at 41.0. The hydrocarbon-hydrogen mixture was charged downflow through a fixed catalyst bed contained in the reactor, and the reactor effluent was passed to the high pressure-low temperature separator wherein a hydrogen-rich gaseous phase was separated at a temperature of about 13° C. A portion of the gaseous phase was continuously withdrawn through a high surface area sodium scrubber and recycled substantially free of water to be commingled with the hydrocarbon feed stock, and the excess over that required to maintain plant pressure was recovered as excess separator gas. The high pressure-low temperature separator liquid phase was withdrawn in a continuous stream through a pressure reducing valve and charged to the debutanizer column where light ends were separated as an overhead fraction, and a $C_5+$ reformate product was recovered as the bottoms fraction.

The catalysts were in each case evaluated in a continuous operation comprising a series of test periods, each of which included a 12 hour line-out period followed by a 12 hour period during which the $C_5+$ product was collected and analyzed. Reaction conditions included a reactor outlet pressure of 100 psig, and a reactor inlet temperature which was continuously adjusted throughout the test in order to achieve and maintain a $C_5+$ target octane number of 102 F-1 clear. The hydrocarbon feed stock was charged to the reactor at a rate to effect a liquid hourly space velocity of about 2.0, and the hydrogen-rich gas (75–90% $H_2$) was recycled from the high pressure-low temperature separator and commingled with the hydrocarbon feed stock in a 5.0:1 mole ratio, equivalent to a hydrogen/hydrocarbon mole ratio of from about 3.75 to about 4.5:1 as determined by the recycle hydrogen purity.

The results of the tests are presented for each test period in Table I in terms of the inlet temperature to the reactor necessary to achieve the target octane number, and the amount of $C_5+$ reformate recovered, expressed as liquid volume percent (LV%) of the charge stock.

TABLE I

| Period | Catalyst "A" | | Catalyst "B" | |
|---|---|---|---|---|
| | T, °C. | $C_5^+$, LV% | T, °C. | $C_5^+$, LV% |
| 1 | 510 | 75.0 | 510 | 76.4 |
| 2 | 508 | 76.3 | 509 | 77.0 |
| 3 | 509 | 74.4 | 508 | 77.7 |
| 4 | 511 | 75.2 | 509 | 76.3 |
| 5 | 510 | 76.0 | 511 | 74.7 |
| 10 | 514 | 75.9 | 514 | 76.6 |
| 15 | 523 | 75.6 | 522 | 75.2 |
| 20 | 544 | 73.0 | 527 | 74.7 |
| 25 | — | — | 535 | 74.0 |

The reforming conditions under which the catalysts of the foregoing examples were evaluated were designed to measure, on an accelerated basis, the activity stability thereof. While the catalysts are both relatively active reforming catalysts, especially under more conventional reforming conditions, an appreciable difference in activity stability is apparent at the exceptionally severe reforming conditions employed. While Catalysts "A" and "B" both contain an added cobalt component, the latter, in which the impregnated carrier material was dried in strict accordance with the method of this invention, exhibits a dramatic improvement in activity stability. Thus, the data clearly illustrates that the critical factor in the improved activity stability of the cobalt-containing catalyst is the drying of the impregnated carrier material in conformance with the claimed method of this invention.

I claim as my invention:

1. A method of catalyst manufacture which comprises:
    (a) preparing a calcined tin-containing refractory inorganic oxide carrier material;
    (b) impregnating said carrier material with an acid solution of a platinum precursor compound and a cobalt precursor compound, said precursor compounds being convertible to oxide form on heating in an oxidizing atmosphere;
    (c) maintaining the impregnated carrier material in an agitated state at a temperature up to about 195° C. over an extended period, and drying said carrier material to a volatile content of not greater than about 12.6 wt. % as determined by weight loss on ignition at 900° C., said extended period being equivalent to at least about 0.5 hours per 100 pounds of impregnated carrier material on a volatile-free basis, and not less than 2 hours; and
    (d) heating the dried impregnated carrier material in an oxidizing atmosphere at a temperature of from about 450° to about 675° C. and thereafter in a reducing atmosphere at a temperature of from about 300 to about 675° C.

2. The method of claim 1 further characterized with respect to step (a) in that said carrier material is a spheroidal alumina containing from about 0.01 to about 5.0 wt. % tin.

3. The method of claim 1 further characterized with respect to step (a) in that said carrier material is a spheroidal alumina containing from about 0.01 to about 5.0 wt. % tin prepared by (i) dissolving a tin chloride in an aluminum chloride hydrosol containing aluminum in from about a 1:1 to about a 1.5:1 atom ratio with the chloride anion content thereof; (ii) commingling said hydrosol at below gelation temperature with sufficient hexamethylenetetramine to effect substantially complete neutralization of said chloride anion content, (iii) dispersing the mixture as droplets in a hot oil bath effecting hydrolysis of said hexamethylenetetramine and the formation of spheroidal gel particles, and (iv) calcining said particles at a temperature of from about 425° to about 815° C.

4. The method of claim 1 further characterized in that said platinum precursor compound is chloroplatinic acid.

5. The method of claim 1 further characterized in that said cobalt precursor compound is cobalt dichloride hexahydrate.

6. The method of claim 1 further characterized with respect to step (c) in that said extended period is equivalent to from about 0.5 to about 1.25 hours per 100 pounds of impregnated carrier material on a volatile-free basis, and not less than about 2 hours.

* * * * *